(12) United States Patent
Moore et al.

(10) Patent No.: US 8,868,231 B2
(45) Date of Patent: Oct. 21, 2014

(54) FLEXIBLE PRODUCTION COLLATING SYSTEM

(75) Inventors: Kenneth P. Moore, Rochester, NY (US); Douglas K. Herrmann, Webster, NY (US); Derek A. Bryl, Webster, NY (US); Paul N. Richards, Fairport, NY (US); Richard Scarlata, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 466 days.

(21) Appl. No.: 13/206,566

(22) Filed: Aug. 10, 2011

(65) Prior Publication Data
US 2013/0041495 A1    Feb. 14, 2013

(51) Int. Cl.
G06F 19/00 (2011.01)
B25J 1/00 (2006.01)
B65B 35/50 (2006.01)
B65G 1/18 (2006.01)
B03B 13/00 (2006.01)
B07B 1/00 (2006.01)
B07B 1/46 (2006.01)
B25J 9/00 (2006.01)
B25J 15/00 (2006.01)

(52) U.S. Cl.
CPC .......... *B25J 9/0084* (2013.01); *B25J 15/0052* (2013.01); *B25J 9/0093* (2013.01); *Y10S 901/02* (2013.01); *Y10S 901/19* (2013.01); *Y10S 901/30* (2013.01); *Y10S 901/46* (2013.01)
USPC ............... 700/223; 700/112; 700/245; 414/1; 414/788.1; 414/799; 209/1; 209/233; 209/257; 901/2; 901/19; 901/30; 901/46

(58) Field of Classification Search
USPC ........ 700/223, 245; 414/1, 788.1–789.9, 799; 209/1, 233, 257; 901/2, 14, 19, 30, 46
See application file for complete search history.

(56) References Cited

U.S. PATENT DOCUMENTS

| | | | |
|---|---|---|---|
| 3,966,318 A | 6/1976 | Amort | |
| 4,910,864 A | 3/1990 | Elliott | |
| 4,921,237 A | 5/1990 | Nubson et al. | |
| 5,501,571 A * | 3/1996 | Van Durrett et al. | 414/801 |
| 5,632,590 A | 5/1997 | Pearson et al. | |
| 5,653,671 A | 8/1997 | Reuteler | |
| 5,680,746 A | 10/1997 | Hornisch | |
| 5,803,447 A | 9/1998 | Singer et al. | |
| 5,819,954 A | 10/1998 | Lacriola | |
| 5,924,840 A | 7/1999 | Charron et al. | |
| 6,032,004 A | 2/2000 | Mirabella, Jr. et al. | |
| 6,934,605 B1 * | 8/2005 | Dothan et al. | 700/245 |
| 7,654,380 B2 * | 2/2010 | Nishihara et al. | 198/349 |
| 8,442,668 B2 * | 5/2013 | Nishihara et al. | 700/213 |
| 2002/0140242 A1 * | 10/2002 | Byers et al. | 294/86.4 |
| 2005/0075752 A1 * | 4/2005 | Ban et al. | 700/213 |

(Continued)

*Primary Examiner* — Darrin Dunn
(74) *Attorney, Agent, or Firm* — Gibb & Riley, LLC

(57) ABSTRACT

In a system, one or more robotic arms are positioned adjacent a transport surface that is moving workpieces, and one or more picking elements are connected to each of the robotic arms. The picking elements have physical picking features that remove the workpieces from the transport surface and move the workpieces to another location. A controller is operatively connected to the robotic arms and the picking elements, and the controller independently controls the robotic arms and the picking elements to dynamically position the picking elements in coordination with a dynamic size, spacing, and transport speed of the workpieces being moved by the transport surface.

16 Claims, 5 Drawing Sheets

(56) References Cited

U.S. PATENT DOCUMENTS

| | | |
|---|---|---|
| 2007/0108109 A1* | 5/2007 | Erlandsson-Warvelin et al. ............................ 209/629 |
| 2009/0099687 A1* | 4/2009 | Nordling et al. .............. 700/230 |
| 2009/0200137 A1* | 8/2009 | Ray et al. ................. 198/341.06 |
| 2012/0226382 A1* | 9/2012 | Asada .......................... 700/259 |
| 2013/0002444 A1* | 1/2013 | Bitzel et al. ................ 340/686.5 |

\* cited by examiner

FLEXIBLE PRODUCTION COLLATING SYSTEM

BACKGROUND

Embodiments herein generally relate to manufacturing transport systems, and more particularly to systems that use a controller to independently control robotic arms and picking elements to dynamically position the picking elements in coordination with the dynamic size, spacing, and transport speed of workpieces being moved by a transport surface.

High-speed digital printing systems exist that offer the ability to print, cut, and package custom signage. This is accomplished through tandem or individual printers, a programmable laser sign cutter, a stacking system, and shrink-wrap packaging line. Since only the sign printing and cutting methods are completely flexible, the collating/stacking system remains as the limiting factor in having a fully flexible system (since it is limited to only compiling signs of a certain size and shape). Major redesign of the collating/stacking system would be required in order to efficiently handle anything other than the current fixed-size options. There is now demand for a more flexible system to enable a wide variety of quick turnaround, variable data signage with a much broader range of size and shape.

SUMMARY

Various exemplary systems herein comprise a production machine (such as a laser cutter) producing the workpieces (such as printed signs). The production machine is operatively connected to a controller and provides the controller with dynamic size, spacing, and transport speed of the workpieces on a transport belt (sometimes called a "transport surface" herein). One or more robotic arms (such as spider-type robotic arms) are positioned adjacent the transport surface that is moving the workpieces, and at least two picking elements (e.g., suction devices) are connected to each of the robotic arms.

In some embodiments, one or more bars are connected to the effector ends of the robotic arms. Each of the bars can have one or more picking elements. In one embodiment, a plurality of independently controllable robotic arms has bars, and the robotic arms are controlled by the controller to move the bars.

The picking elements have physical picking features that remove the workpieces from the transport surface and move the workpieces to another location (e.g., to a stacking area). A controller is operatively connected to the robotic arms and the picking elements, and the controller independently controls the robotic arms and the picking elements to dynamically position the picking elements in coordination with the dynamic size, spacing, and transport speed of the workpieces being moved by the transport surface.

In the embodiments herein, the controller independently and automatically controls movement of the robotic arms and actuation of the picking elements to dynamically position and actuate the picking elements in coordination with each different job-specific pattern of the workpieces output to the transport surface.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
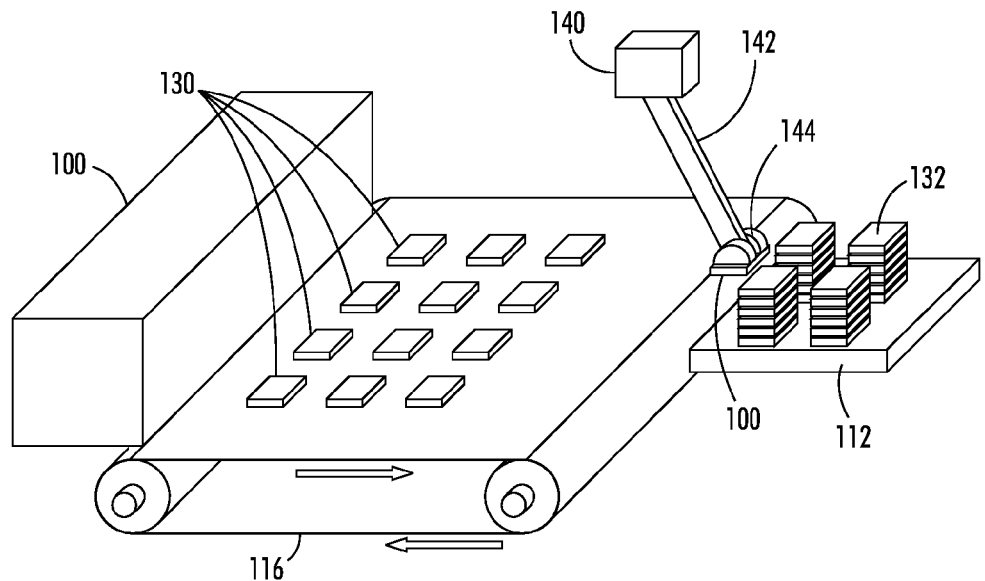
FIG. 1 is a perspective-view schematic diagram of a device according to embodiments herein.

The following embodiments provide flexible sign "picking and stacking" systems. In the examples presented below, this system is positioned at the end of a belt 116 (also referred to sometimes as a transport surface, production belt, transport belt, or a laser belt) of a manufacturing device 100, such as a laser sign cutting machine (FIG. 1). However, one ordinarily skilled in the art would understand that the systems herein are not limited to any specific machine, and the systems herein can be positioned next to and used with any manufacturing machine that produces workpieces.

One exemplary system herein (shown in perspective view in FIGS. 1-4, and side view in FIG. 8) can include, for example, one or more robotic arms 142 that remove workpieces 130 from the transport surface 116. The robotic arm 142 includes various drive motors/controllers 140, one or more arms 142, and an end effector 144. Robotic arms are commercially available from many vendors, such as Fanuc Robotics America Corporation, Rochester Hills, Mich., USA, and Adept Technology, Inc., Pleasanton, Calif., USA.

The end effector 144 (which are sometimes referred to herein as a vacuum or suction cups, picking elements, etc.) can be of any form, such as a clamp, claw, shovel, vacuum cup, electromagnetic surface, or any other device capable of picking up and holding a workpiece 100. Different end effectors 144 can be used depending upon the nature of the workpiece 100. To simplify discussion, a vacuum cup is used as an example of an end effector herein, but those ordinarily skilled in the art would understand that any end effector (picking device) can be used with embodiments herein, whether currently known or developed in the future.

Figure 2:
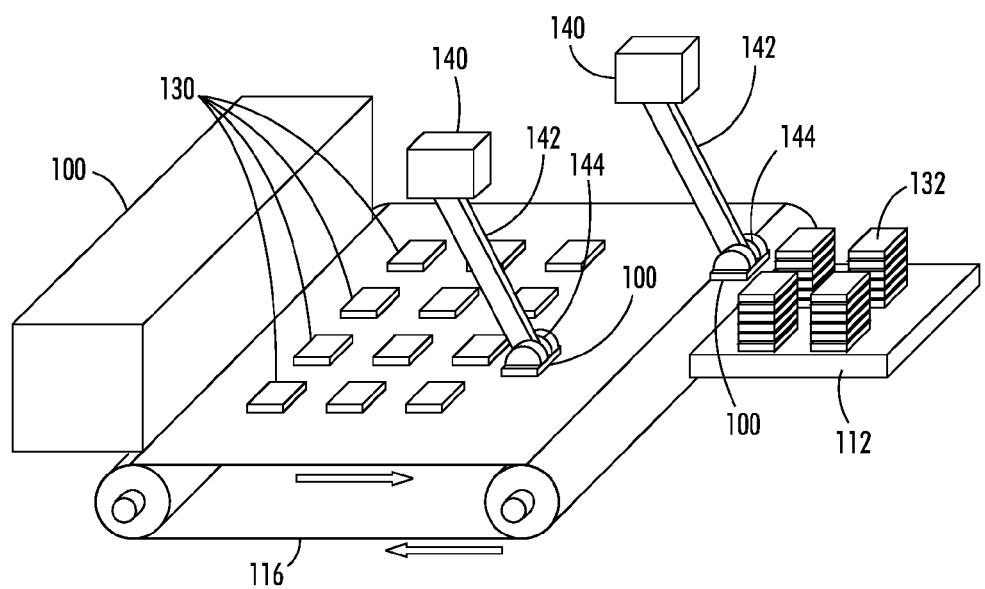
FIG. 2 is a side-view schematic diagram of a device according to embodiments herein.
Figure 3:
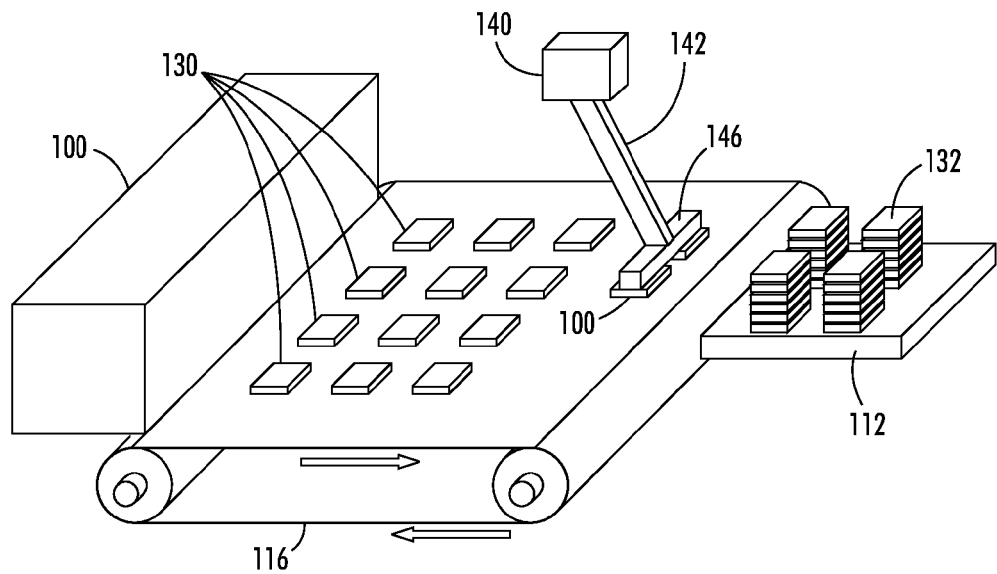
FIG. 3 is a perspective-view schematic diagram of a device according to embodiments herein.
Figure 4:
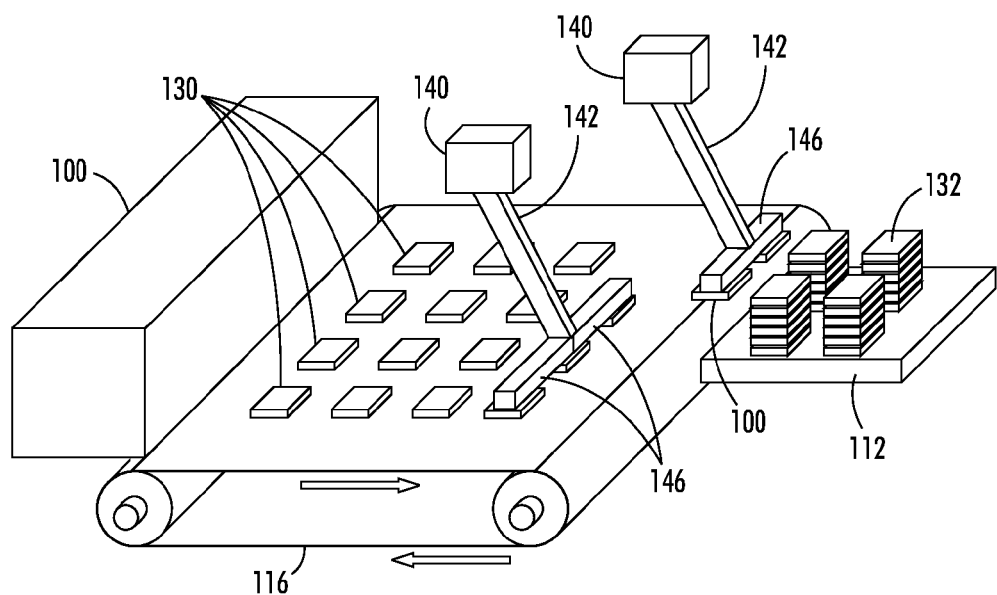
FIG. 4 is a perspective-view schematic diagram of a device according to embodiments herein.

FIG. 1 illustrates a single robotic arm 142 removing workpieces 100 from the transport surface 116 and stacking the workpieces 100 into stacks 132 in a stacking area 112. FIG. 2 illustrates two such robotic arms 142 working in unison (simultaneously) to stack items faster than a single robotic arm 142. Each of the robotic arms 142 can reach any location on the transport surface 116 to remove workpieces. In the examples shown in FIGS. 1-2, each robotic arm 142 includes a single end effector 146; however, as shown in FIGS. 3-4, each of the robotic arms 142 can carry one or more suction "picker" bars 146. Each of the bars 146 includes multiple end effectors 144 (see FIGS. 5-7, discussed below). Thus, in FIGS. 3-4, each bar 146 includes multiple suction cups 144 for handling multiple lanes of workpieces 130 on the belt 116. Note that one of the robotic arms 142 in FIG. 4 has a single bar 146, while another of the robotic arms in FIG. 4 has two bars 146.

Figure 5:
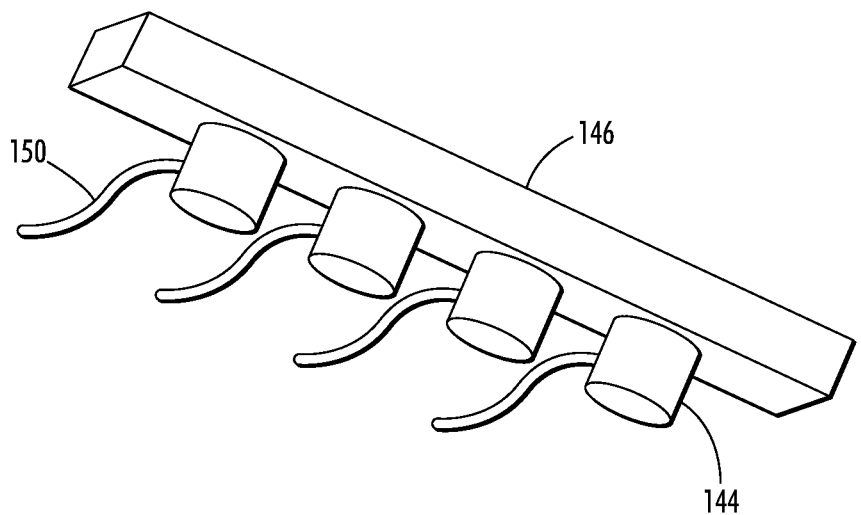
FIG. 5 is a perspective-view schematic diagram of a device according to embodiments herein.
Figure 6:
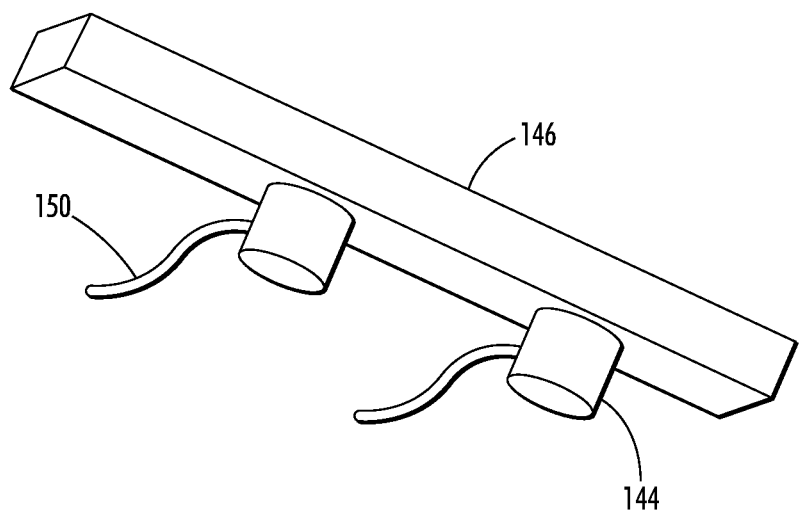
FIG. 6 is a side-view schematic diagram of a device according to embodiments herein.
Figure 7:
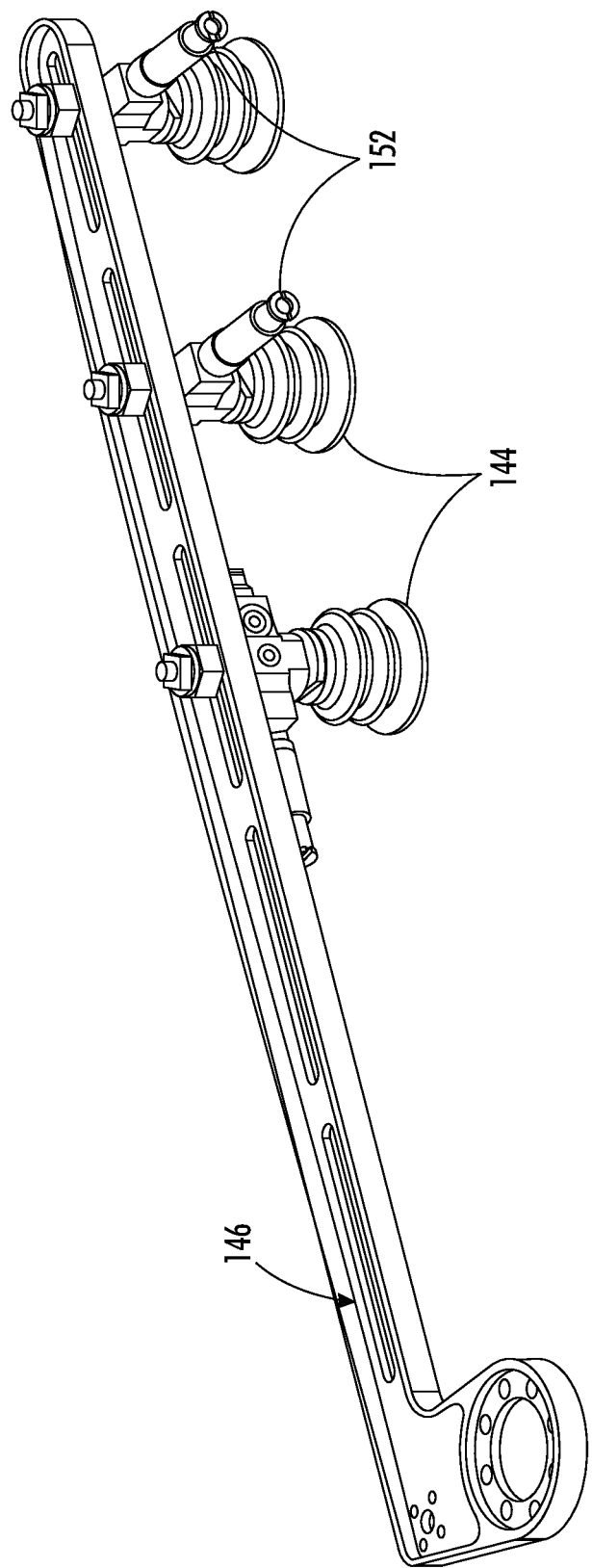
FIG. 7 is a side-view schematic diagram of a device according to embodiments herein.

FIGS. 5-7 illustrate more and less numbers of suction cups 144 (e.g., 4 suction cups, 2 suction cups, 3 suctions cups, etc.) on different bars 146 and vacuum lines 150 that provide a suction force to the suction cups 144. FIG. 7 also illustrates vacuum line connections 152. The vacuum lines/connections 150/152 are only illustrated in FIGS. 5-7 to avoid clutter in the other drawings but, as would be understood by those ordinarily skilled in the art, such elements could be included in the other structures. Suction cup systems, belts, etc., are well-known individual structures and are not discussed herein in detail. For a detailed discussion of such structures see U.S. Pat. No. 3,966,318 (the complete disclosure of which is incorporated herein by reference).

As would be understood by those ordinarily skilled in the art, any number of end effectors (such as suction cups 144) can be used with the bars 146, depending upon the specific application. In addition, in some embodiments, different bars 146 can include different numbers of suction cups 144 to provide additional flexibility in the picking operation.

Vacuum is applied to the suction cups 144 to remove the workpieces 130 from the belt 116. The vacuum suction cups 144 can be either static or dynamic to allow for multiple heights during the picking and placing processes. After the suction cups 144 pick up the workpieces 130, the robotic arms 142 independently move the end effectors 144 to transport the workpieces. The vacuum is then discontinued to deposit the workpieces 130 onto a nearby stacking area 112. This stacks the workpieces 130 in stacking area 112, until the workpieces 130 are moved (by the stacking area 112) to downstream packaging or finishing operations. The picker bars 146 can alternatively deliver larger signage to another conveyor belt, instead of a stacking area 112.

A processor/controller (discussed in greater detail below) independently controls each of the robotic arms 142. Therefore, the robotic arms 142 can be moved at different speeds relative to each other. This allows the end effectors 144 to be moved independently of one another to accommodate different operating speeds of the processing belt 116 and the stacking area 112. Therefore, for example, the end effectors 144 could move at one speed when removing the workpieces 130 from the production belt 116, and the end effectors 144 could move at a different speed when depositing the workpieces 130 in the stacking area 112.

Further, one (or more) of the robotic arms 142 could be moving one (or more) of the bars 146 at one speed while, at the same time (simultaneously) a different robotic arm 142 could be moving a different bar (or bars) 146 at a different speed (making the bar speeds independent of one another). Further, the robotic arms 142 can move the end effectors 144 and picker bars 146 at a different speed than the processing belt 116 moves, to enable the end effectors 144 greater variability for picking the workpieces from the processing belt 116 and placing the workpieces in the stacker area 112.

Further, the movement of the end effectors 144 is performed in real time continuously and dynamically to accommodate for different (and potentially dynamically changing) conditions occurring on the processing belt 116 and the stacker unit 112. The controller regularly receives a series of different jobs, one after the other. Each of the jobs contains different job-specific instructions that define cuts to be made by the laser cutter, which could be different for each job. The different job-specific instructions also define a pattern of workpieces that will be output to the transport surface (that could also be different for each job). Thus, the controller independently and automatically controls movement of the robotic arms 142 and end effectors 144, and controls actuation of the picking elements to dynamically position and actuate the picking elements in coordination with each different job-specific pattern of the workpieces 130 output to the transport surface 116, without pausing between jobs.

In other words, according to the requirements of each job, the processor changes the action of the cutter to output different patterns of workpieces corresponding to each different job, and simultaneously changes the movement of the robotic arms 142 and the actuation of the suction cups 144 to match the pattern of the workpieces currently being output to the transport belt 116. To the contrary, conventional systems require a manual reconfiguration of the picking device between jobs that will change the pattern of workpieces output to the transport belt 116. Therefore, these high speed pick and place devices utilize independent robotic arms 142 and end effectors 144 to enable acceleration or deceleration before and after picking or placing the workpiece 130. Further, such processing does not impact workpiece placement.

In addition, as shown in FIGS. 5-7 different picker bars 146 can include different numbers of suction cups 144. Therefore, certain picker bars can be selectively used to process a first number of lanes of workpieces 130, while other picker bars 146 can be used to process different patterns of workpieces 130, allowing a mixture of different numbers of lanes to be picked. Whether one lane, two lanes, three lanes, four lanes, etc., are processed is dynamically controlled by the processor/controller (through different movement of the different robotic arms 142, and different actuation of different suction cups 144) to dynamically accommodate any pattern of lanes of workpieces 130 that may be dynamically produced onto the production belt 116.

Thus, in one embodiment, each transport surface can be accompanied by two robotic arms 142, one of which has a bar 146 with three suction cups 144 and the other of which has a different bar with four suction cups 144. In this example then, the robotic arms 142 can selectively activate the suction cups 144 to have the picker bars pick anywhere between 1 and 7 lanes of workpieces 100 on the transport surface 116 during one processing run. Subsequently, during another processing run, a different number of suction cups 144 can be activated and selectively positioned over the production belts 116 to dynamically process a different number of lanes of workpieces 130, without having to physically alter the system in any way whatsoever.

The alignment of the end effectors 144 to the workpieces 130 in the process direction is accomplished by timing the end effectors 144 (picker head) velocity profile to sync with the known locations of the approaching workpieces 130 on the laser belt 116, as controlled by the controller. In one example, machine readable markings, such as bar codes on each sheet of workpieces produced can identify to the processor all necessary workpiece cutting, speed, and positional information. Alternatively, input sheets used to create the workpieces 130 can similarly contain such machine readable markings, or the cutting/positional location information of the workpieces 130 can be transferred to the processor/controller through any network connection (or can be provided by user input through, for example, a graphic user interface).

For example, preprinted sheets of signs (containing machine readable markings, such as barcodes) that need to be laser cut into individual signs can be supplied to the processor/controller to control a laser cutting machine which cuts the preprinted sheets according to the predetermined pattern required by the barcodes to produce individual signs (workpieces) 130 that are placed on the production belt 116. The machine readable markings are also utilized by the processor/controller to know what the pattern of workpieces will be on the production belt 116. Given this, the processor/controller can control the speed of the different robotic arms 142 (based on such barcode information, for example) and the activation/deactivation of the vacuum supplied to the suction cups 144 (along with the speed of the robotic arms 142) to adjust the position and speed of the suction cups 144 to match that of the workpieces 130 on the belt 116. Such adjustments can be made automatically (without additional user intervention/adjustment) and dynamically for each different sheet that is to be laser cut, such that virtually any pattern of laser cutting can be automatically accommodated by the picking systems described in these embodiments for each different sheet that is laser cut.

In addition, the systems herein can handle any number of lanes of workpieces 130 "on the fly" as required by selectively valving the pickers as needed to pick lanes only where cut workpieces 130 exist (to avoid picking the unwanted scrim (scrap)) which generally falls off the end of the belt 116 if it is not picked by one of the suction cups 144. The suction cups 144 need not be re-positioned to account for the number of lanes that the workpieces 130 will appear in different future jobs. The suction cups 144 are also made to be manually or automatically adjustable along the length of the bars 146 to account for any type of lane spacing.

This system can process workpieces, including signage, custom packaging applications, etc. For larger signage or sheets the robotic arms 142 can overlap an optional conveyor to enable the transfer of larger workpieces 130 or sheets from the laser belt 116. After the end effectors 144 acquire either one, two, three, or more lanes of workpieces 130, they then deposit the workpieces 130 onto the stacking area 112.

Therefore, the system presented herein can dynamically process different jobs that may be produced onto the belt 116, wherein the different jobs may produce workpieces 130 in various numbers of lanes, may space the workpieces 130 dynamically on the production belt 116, may cause the robotic arms 142 to move at different speeds, etc. Further, the embodiments herein can account for different operational speeds of the processing robotic arms 142 and the stacking area 112.

Thus, the systems described herein enable robotic arms 142 to provide almost any pick frequency and independent "pick and place" operations for flexible high speed signage (or other application) printing. The custom picker bars 146 are designed to pick up different numbers of lanes of workpieces 130 while providing independent valving capability to avoid undesired pick of scrim (scrap).

The systems described herein enable maximum flexibility of production printing system for cut media by removing the barrier of limited size and shape picking and stacking capability while maintaining a high level of process automation and finishing flexibility. This brings the picking system up to the level of flexibility of the rest of modern printing and cutting system. The embodiments herein allow for independent picking and independent placement of cut media and allow for motion profile flexibility due to independence of "pick and place" for multiple drives system option. The systems herein are expandable/flexible systems and can be easily modified by adding or removing any number of picker bars 146. Further, these systems allow the customer to increase translation distance from the belt with limited hardware impact, while maintaining "pick and place" capabilities. Also, these embodiments provide a queuing capability that allows the picker bars 146 to pick at high frequency based on variable data provided for individual sheets. This applies to multiple drive systems also.

Thus, as shown by the previous specific embodiments, this disclosure presents a vastly improved automation system that allows dynamic processing without requiring the user to perform extensive set up operations for each different type of sign or workpiece that is processed. Conventional systems require the user to perform "setup" operations whenever the size, shape, pattern, etc., of the workpiece being produced changes or when the rate at which workpieces are produced changes. To the contrary, the structures and methods provided in this disclosure process many varied jobs (such as the printing and laser cutting of signs) without having to perform any set up operations (except, potentially the loading of different types of media). Therefore, the production of many different jobs can be performed continuously and automatically, without interruption, on the same unaltered manufacturing devices.

As explained above, the production devices herein can continuously receive different jobs and the processors utilized cause the production devices (such as the laser cutting device) to output workpieces onto the transport belt in different shapes, sizes, spacings, and at different rates depending upon the requirements of each individual job. The embodiments herein utilize the various picking devices described above to automatically and dynamically change the way in which the workpieces are removed from the transport belt and the way the workpieces are supplied to the stacking areas (again under control of one or more processors). This eliminates the need to setup the picking devices for the different output requirements of each different job (and the potentially different receiving requirements of each stacking area). To the contrary, when a different job is started in conventional systems, they require that production be stopped, the picking units be set up for the new output that is to be received, and then the new job can be processed.

Because the disclosed devices and methods automatically dynamically adjust to the different sized and shaped workpieces, the different pattern of workpieces on the transport belt, the different speeds of the transport belt, etc., and automatically coordinate the picking process with the potentially constantly changing loading requirements of the stacker, the embodiments herein provide dramatically increased productivity and reduced user frustration (which can often occur during the sometimes elaborate setup procedures). This disclosure therefore presents systems and methods that can automatically process different job after different job, continuously and without interruption, to provide the user with unparalleled capabilities, benefits, and satisfaction.

Figure 8:
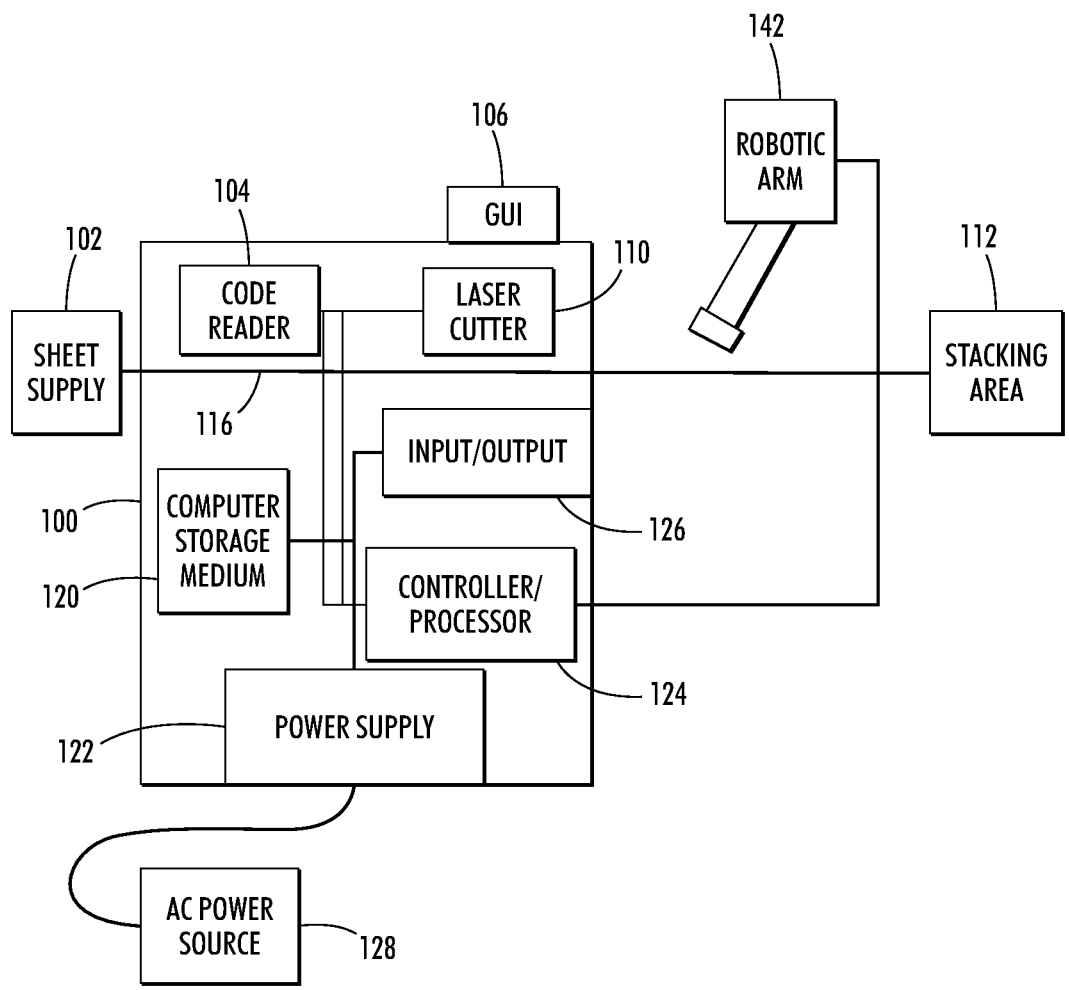
FIG. 8 is a side-view schematic diagram of a device according to embodiments herein.

FIG. 8 illustrates a computerized device 100, which can be used with embodiments herein and can comprise, for example, a laser cutting machine, etc. The device 100 includes a controller/processor 124, a media path 116 positioned to supply sheets of media from a sheet supply 102 to be processed, and a communications port (input/output) 126 operatively connected to the processor 124 and to a computerized network external to the printing device. A power supply 122 is connected to a power source 128 and supplies power to the various components of the device 100.

Also, the device 100 can include at least one accessory functional component such as a graphic user interface assembly 106 and a computer-readable code reader 104 (e.g., bar code scanner) that also operate on the power supplied from the external power source 128 (through the power supply 122). The input/output device 126 is used for communications to and from the device 100. The processor 124 controls the various actions of the device (such as the cutter 110 and the robotic arm 142). A non-transitory computer storage medium device 120 (which can be optical, magnetic, capacitor based, etc.) is readable by the processor 124 and stores instructions that the processor 124 executes to allow the multi-function printing device to perform its various functions, such as those described herein.

A laser cutter 110 (or other form a cutter, such as a knife, stamping machine, etc.) cuts the sheets from the sheet supply 102 into workpieces 130 and leaves the workpieces 130 in a pattern on the transport belt 116 (transport surface). After being cut, the workpieces 130 are picked by the robotic arm(s) 142, which stack the workpieces in the stacking area 112. As mentioned above, the controller 124 independently controls the robotic arm(s) 142 and the picking element(s) 144 to dynamically position the picking elements 144 in coordination with a dynamic size, spacing, and transport speed of the workpieces being moved by the transport surface 116. As would be understood by those ordinarily skilled in the art, the device 100 shown in FIG. 8 is only one example and the embodiments herein are equally applicable to other types of printing devices that may include fewer components or more components.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A system comprising:
    a controller regularly receiving a series of different jobs, each of said jobs containing different job-specific instructions that each define a job-specific pattern;
    a cutter operatively connected to said controller, said cutter cutting individual workpieces from relatively larger sheets, said cutter cutting and outputting said workpieces in said job-specific pattern to a transport surface as controlled by said job-specific instructions defining said job-specific pattern;
    one or more independently movable robotic arms positioned adjacent said transport surface moving said workpieces, said robotic arms being operatively connected to said controller; and
    one or more picking elements connected to said robotic arms, at least one of said picking elements being connected to each of said robotic arms, and said picking elements having physical picking features that remove said workpieces from said transport surface and move said workpieces to another location,
    said controller independently and automatically controlling movement of said robotic arms and actuation of said picking elements based on said job instructions defining said job-specific pattern to continuously and dynamically position and actuate said picking elements in coordination in real time with each different job-specific pattern of said workpieces as said workpieces are output from said cutter on said transport surface, without pausing between said different jobs.

2. The system according to claim 1, said picking elements comprising suction devices.

3. The system according to claim 1, said robotic arms each having multiple ones of said picking elements.

4. The system according to claim 1, said picking elements moving said workpieces from said transport surface to a stacking area.

5. A system comprising:
    a controller regularly receiving a series of different jobs, each of said jobs containing different job-specific instructions that each define a job-specific pattern;
    a cutter operatively connected to said controller, said cutter cutting individual workpieces from relatively larger sheets, said cutter cutting and outputting said workpieces in said job-specific pattern to a transport surface as controlled by said job-specific instructions defining said job-specific pattern;
    independently movable robotic arms positioned adjacent said transport surface moving said workpieces, said robotic arms being operatively connected to said controller;
    bars connected to ends of said robotic arms;
    picking elements connected to said bars, at least two of said picking elements being connected to each of said bars, and said picking elements having physical picking features that remove said workpieces from said transport surface and move said workpieces to another location; and
    said controller independently and automatically controlling movement of said robotic arms and actuation of said picking elements based on said job instructions defining said job-specific pattern to continuously and dynamically position and actuate said picking elements in coordination in real time with each different job-specific pattern of said workpieces as said workpieces are output from said cutter on said transport surface, without pausing between said different jobs.

6. The system according to claim 5, said picking elements comprising suction devices.

7. The system according to claim 5, said picking elements moving said workpieces from said transport surface to a stacking area.

8. The system according to claim 5, said picking elements comprising suction devices connected to said bars.

9. A system comprising:
   a controller regularly receiving a series of different jobs, each of said jobs containing different job-specific instructions that each define a job-specific pattern;
   a cutter operatively connected to said controller, said cutter cutting individual workpieces from relatively larger sheets, said cutter cutting and outputting said workpieces in said job-specific pattern to a transport surface as controlled by said job-specific instructions defining said job-specific pattern;
   robotic arms positioned adjacent said transport surface moving said workpieces, said robotic arms being independently movable relative to each other, said robotic arms being operatively connected to said controller;
   bars connected to said robotic arms, each of said robotic arms being connected to at least one of said bars and each of said bars being connected to only one of said robotic arms, independent movement of said robotic arms causing independent movement of said bars relative to each other;
   picking elements connected to each of said bars, at least two of said picking elements being connected to each of said bars, said picking elements having physical picking features that remove said workpieces from said transport surface and move said workpieces to another location; and
   said controller independently and automatically controlling movement of said robotic arms and actuation of said picking elements based on said job instructions defining said job-specific pattern to continuously and dynamically position and actuate said picking elements in coordination in real time with each different job-specific pattern of said workpieces as said workpieces are output from said cutter on said transport surface, without pausing between said different jobs.

10. The system according to claim 9, said picking elements comprising suction devices.

11. The system according to claim 9, said picking elements moving said workpieces from said transport surface to a stacking area.

12. The system according to claim 9, said picking elements comprising suction devices connected to said bars.

13. A system comprising:
    a controller regularly receiving a series of different jobs, each of said jobs containing different job-specific instructions that each define a job-specific pattern;
    a cutter operatively connected to said controller, said cutter cutting individual workpieces from relatively larger sheets, said cutter cutting and outputting said workpieces in said job-specific pattern to a transport surface as controlled by said job-specific instructions defining said job-specific pattern;
    robotic arms positioned adjacent said transport surface said robotic arms being independently movable relative to each other, said robotic arms being operatively connected to said controller;
    bars connected to said robotic arms, each of said robotic arms being connected to at least one of said bars, independent movement of said robotic arms causing independent movement of said bars relative to each other;
    picking elements connected to each of said bars, at least two of said picking elements being connected to each of said bars, said picking elements having physical picking features that remove said workpieces from said transport surface and move said workpieces to another location; and
    said controller receiving a series of different jobs, each of said jobs containing different job-specific instructions that define cuts to be made by said cutter and define a pattern of said workpieces that will be output to said transport surface, and
    said controller independently and automatically controlling movement of said robotic arms and actuation of said picking elements based on said job instructions defining said job-specific pattern to continuously and dynamically position and actuate said picking elements in coordination in real time with each different job-specific pattern of said workpieces as said workpieces are output from said cutter on said transport surface, without pausing between said different jobs.

14. The system according to claim 13, said picking elements comprising suction devices.

15. The system according to claim 13, and said picking elements moving said workpieces from said transport surface to a stacking area.

16. The system according to claim 13, said picking elements comprising suction devices connected to said bars.

* * * * *